April 1, 1969 — F. W. SCHLUE, JR — 3,435,953
UNIVERSAL CROP SEPARATOR
Filed Oct. 12, 1966
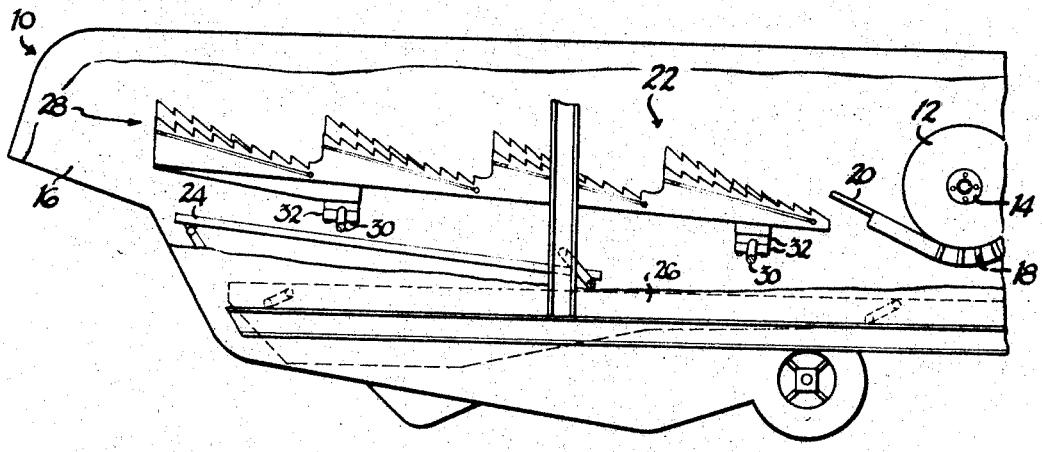
Fig. 1
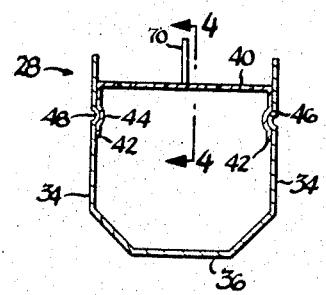
Fig. 3
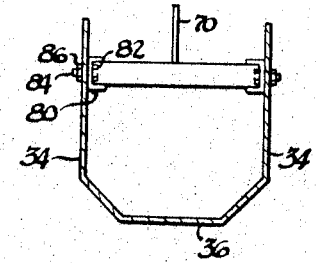
Fig. 5
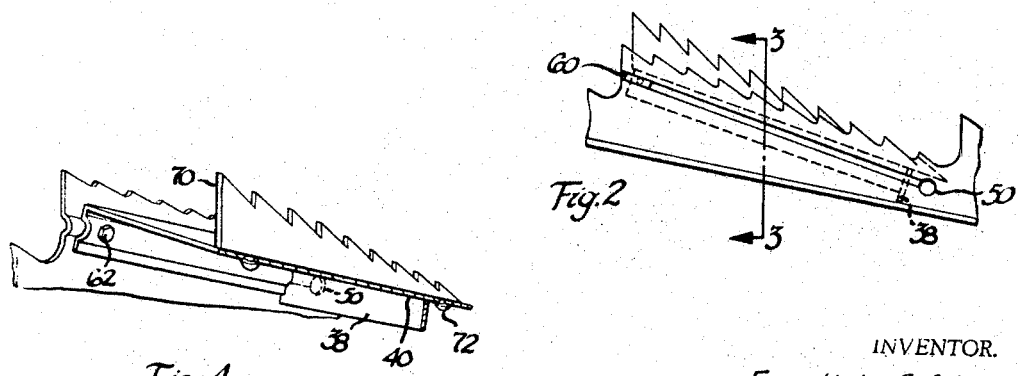
Fig. 4
Fig. 2
INVENTOR.
Frank W. Schlue, Jr.
BY WILSON, SETTLE, BATCHELDER
ATT'YS. & CRAIG.

United States Patent Office 3,435,953
Patented Apr. 1, 1969

3,435,953
UNIVERSAL CROP SEPARATOR
Frank W. Schlue, Jr., Davenport, Iowa, asisgnor to J. I. Case Company, Racine, Wis., a corporation of Wisconsin
Filed Oct. 12, 1966, Ser. No. 586,265
Int. Cl. B01d 33/34, 21/18
U.S. Cl. 209—408                                      2 Claims

ABSTRACT OF THE DISCLOSURE

Mounting means for crop separators of a harvesting machine which include first parts defined on the spaced side members of the separator with cooperating second parts on grid sections which slidably receive the first part to releasably retain the grid sections of the side members.

Background of the invention

The present invention relates generally to harvesting machines and more particularly to improved crop separators for such machines.

In the operation of certain types of harvesting machines, such as combines, the harvested crop is passed through a threshing mechanism wherein most of the kernels of grain are separated from the harvested material. The remainder of the harvested material, having some of the kernels of grain remaining therein, is then received on a crop separating structure, such as a group of straw-walkers, disposed rearwardly of the threshing mechanism. The material is moved rearwardly on the straw-walkers which are agitated to separate the remaining grain from the harvested material.

Harvesting machines are being constructed with a view towards versatility so that they may be used for harvesting several different crops. However, in designing such a machine it has been found that difficulties have been encountered in producing a crop separator which is capable of separating the grain from the remainder of the harvested crop for the various types of crops.

Summary of the invention

The primary object of the present invention is to provide an improved crop separator which may readily be adapted to harvesting different crops.

Another object is to provide an improved crop separator in which the separating members or means may be readily replaced to thereby increase the efficiency of a harvesting machine for harvesting a variety of crops.

These and other objects are accomplished by a crop separator of the present invention which includes a pair of spaced side members and crop separating means or grid sections carried intermediate the side members and removably retained on the side members.

In the drawings:

FIGURE 1 is a fragmentary side elevational view of a threshing mechainsm including the crop separator of the present invention, parts being removed and others broken away to show the details of the invention;

FIGURE 2 is an enlarged fragmentary side elevational view of the crop separator of the invention;

FIGURE 3 is a sectional view taken generally along lines 3—3 of FIGURE 2;

FIGURE 4 is a vertical sectional view taken along lines 4—4 of FIGURE 3; and

FIGURE 5 is an end view, similar to FIGURE 3, showing a modified form of the invention.

With particular reference to the drawings, the threshing mechanism incorporating the invention includes a housing 10 and a cylinder 12, which is journalled in bearings 14 carried by the side members 16 of the housing 10. A concave 18 is suitably supported in close proximity to the cylinder 12 and has a plurality of fingers forming a grate 20 directed to a region above a crop separator 22.

The threshing machine further includes a grain return pan 24 and a combination grain pan and cleaning shoe 26, both of which are movably mounted within the housing 10 in a manner well known in the art. Since the grain return pan and the cleaning shoe form no part of the invention, the details of the mounting and driving means will not be described.

The crop separator 22 of the present invention is illustratively shown as including a plurality of straw-walker sections 28 which are mounted for oscillating movement by driving means, such as a pair of multiple-throw crankshafts 30 fixedly secured to each of the walker sections by split bearings 32. Either or both of the crankshafts may be driven to provide the oscillating movement.

Each of the walker sections 28 includes a pair of spaced side members 34 interconnected at the lower end thereof by an angled member 36. A plurality of transversely extending plates 38 are disposed transversely intermediate the side members 34 and have the opposite ends thereof fixedly secured to the inner surfaces of the side members 34.

The walker sections 28 further include a plurality of separating members or grid sections 40 removably secured to the spaced side members, in accordance with the present invention. Each of the grid sections 40 is mounted on the side members in an identical manner so that a description of the mounting means of one member will be sufficient for the present purpose.

In the preferred embodiment illustrated in FIGURE 3, the mounting means includes a pair of downwardly directed extensions 42 which are integrally connected to the opposite side edges of the grid section 40. Each of the extensions is provided with an inwardly directed bead 44 forming an arcuate recess 46 on the outer surface of the respective extension 42. Each of the side members is also provided with an inwardly directed bead 48 which is slidably received in the recess 46 on the respective extension 42. The lower end of the bead is provided with an opening 50 which will allow any grain or other material collected in the recess portion of the bead 48 to slide downwardly towards the opening and be removed therefrom. If desired the beads on either the grid extensions or the side members may be discontinuous or the beads on either the side members or extensions may be replaced by slots.

The forward edge portion of each grid section 40 engages the transversely vertically extending plate 38 carried intermediate the side members 34. Each of the grid sections 40 is maintained in proper position with respect to the side members by a special bolt 60 which has an elongated head portion that has an inner surface conforming to the configuration of the recess portion of the bead 48. The stud portion of the bolt 60 is received in an opening located adjacent the rear end of the beads 44 and 46 and threadedly receives a nut 62 so as to lock the grid section between the side members 34 and the vertically extending plate 38. As can readily be appreciated the beads will also strengthen the side members by acting as a rigidifying member. Furthermore, the use of beads will eliminate spot welding of the grid sections which results in less distortion in the finished unit.

Each of the grids is further provided with a removable riser 70 which has a pair of spaced resilient means or members 72 fixedly secured to the lower edge thereof. The resilient means 72 may be in the form of spring members having spaced upper legs and a triangular shaped pointed lower portion which is adapted to be received in an opening in the grid section 40.

A plurality of sets of grid sections are provided for one machine with each set being specifically designed for harvesting a particular crop, such as corn, wheat or rice. The openings for each set of grids are constructed and arranged so as to be most efficient for a particular type of crop. Therefore, when the harvesting machine is intended to be used for a different crop, each of the grid sections of the respective walker sections are removed and a new set of grid sections are substituted which are specifically designed for the new crop to be harvested.

In the modified form of the invention, shown in FIGURE 5, the mounting means includes a channel-shaped member 80 secured to the inner surface of each of the side members 34. Each grid section is held in fixed relation to the side members by having the forward edge in contacting engagement with the vertically extending plate 38 and the rear edge engaging an elongated head 82 of a bolt 84 received in an opening extending through the channel member and the side member at the rear end thereof and threadedly receives a nut 86. The riser 70 may also be removably secured to the grid section intermediate the side edges thereof in a manner identical to that disclosed in the preferred embodiment of the invention.

Although the invention has been described with particular reference to walker sections, it is readily apparent and is within the spirit of the invention that the grid sections may be removably maintained in a crop separator, such as a strawrack. Therefore, it should be understood that the illustrated embodiments of the invention are disclosed for purposes of illustration only and the scope of the invention is intended to be limited only by the following claims.

I claim:

1. In combination with a harvesting machine having a longitudinally extending crop receiving passageway, a crop separating mechanism disposed in said passageway for separating harvested material received in said passageway, the improvement of said separating mechanism comprising a pair of spaced side members extending substantially horizontally along said passageway, a plurality of grid sections, and means removably securing said grid sections between said side members, said last means comprising first means displaced from the main body of said side members and defining inwardly directed cooperating sets of beads on each of said side members, means defining recesses on opposed sides of each of said grid sections and slidably receiving respective beads, means defining openings adjacent one end of each of said beads for dissipation of harvested material gathered along said beads and means releasably retaining said grid sections on said side members.

2. In combination with a harvesting machine having a longitudinally extending crop receiving passageway, a crop separating mechanism disposed in said passageway for separating harvested material received in said passageway, the improvement of said separating mechanism comprising a pair of spaced side members extending substantially horizontally along said passageway, a plurality of grid sections, and means removably securing said grid sections between said side members, said last means comprising first means displaced from the main body of said side members and defining inwardly directed cooperating sets of beads on each of said side members, means defining recesses on opposed sides of each of said grid sections and slidably receiving respective beads, means extending between said side members adjacent the forward end of each set of beads to define abutments for said grid sections, and means releasably retaining said grid sections on said side members.

References Cited
UNITED STATES PATENTS

| 37,549 | 1/1863 | Major. | |
| 1,416,145 | 5/1922 | Werner | 209—355 X |
| 1,426,908 | 8/1922 | Raney | 130—26 |
| 1,802,923 | 4/1931 | Melish | 209—355 X |
| 2,648,441 | 8/1953 | Soldan | 209—403 X |
| 2,719,524 | 10/1955 | Brinkley | 130—26 |
| 2,865,506 | 12/1958 | Velke | 209—319 X |
| 2,959,285 | 11/1960 | Tonjes | 209—405 X |
| 3,070,231 | 12/1962 | McCorkel | 209—403 X |

FOREIGN PATENTS

| 949,128 | 2/1949 | France. |
| 1,186,311 | 1/1965 | Germany. |
| 19,077 | 3/1929 | Australia. |
| 458,867 | 12/1936 | Great Britain. |

HARRY B. THORNTON, *Primary Examiner.*

ROBERT HALPER, *Assistant Examiner.*

U.S. Cl. X.R.

130—26; 209—396